(12) United States Patent
Kim

(10) Patent No.: US 6,594,778 B1
(45) Date of Patent: Jul. 15, 2003

(54) DUPLEXING STRUCTURE OF SWITCHING SYSTEM PROCESSOR AND METHOD FOR MAINTAINING MEMORY COHERENCY

(75) Inventor: In-Chul Kim, Kyungki-Do (KR)

(73) Assignee: LG Information & Communications, Ltd., Seoul (KR)

( * ) Notice: Subject to any disclaimer, the term of this patent is extended or adjusted under 35 U.S.C. 154(b) by 347 days.

(21) Appl. No.: 09/617,495

(22) Filed: Jul. 17, 2000

(30) Foreign Application Priority Data

Aug. 24, 1999 (KR) ........................................ 1999-35264

(51) Int. Cl.[7] ................................................ G06F 7/02
(52) U.S. Cl. .......................................................... 714/11
(58) Field of Search ...................................... 714/11, 12

(56) References Cited

U.S. PATENT DOCUMENTS

| | | | |
|---|---|---|---|
| 3,889,237 A | | 6/1975 | Alferness et al. ........ 340/172.5 |
| 5,778,206 A | * | 7/1998 | Pain et al. ................... 710/305 |
| 5,963,979 A | * | 10/1999 | Inoue .......................... 711/162 |
| 5,974,491 A | * | 10/1999 | Jung et al. ................... 370/278 |
| 6,034,943 A | * | 3/2000 | Kwon .......................... 370/219 |
| 6,058,491 A | * | 5/2000 | Bossen et al. ................. 714/15 |
| 6,141,718 A | * | 10/2000 | Garnett et al. ............... 710/308 |
| 6,289,022 B1 | * | 9/2001 | Gale et al. ................... 370/412 |

* cited by examiner

*Primary Examiner*—Albert Decady
*Assistant Examiner*—Esaw Abraham
(74) *Attorney, Agent, or Firm*—Fleshner & Kim, LLP

(57) ABSTRACT

A duplexing structure of a switching system processor and a method for maintaining a memory coherency are provided in which both data of an active memory and of a standby memory are concurrently read. The concurrently read data can be compared using hardware. In the duplexing structure, an address corresponding to the concurrent reading operation is set and a path is provided therefore. Accordingly, when an address of the active memory and the standby memory are compared, they are simultaneously accessed and compared for judgement at one time. Thus, a time required for the operation is reduced. In addition, since the comparison result can be recognized according to the kinds of the termination that is applied by hardware, without comparing the two data relying on a series of program operations on the basis of software using the CPU, the load of the CPU required with respect to memory coherency verification can be reduced.

20 Claims, 5 Drawing Sheets

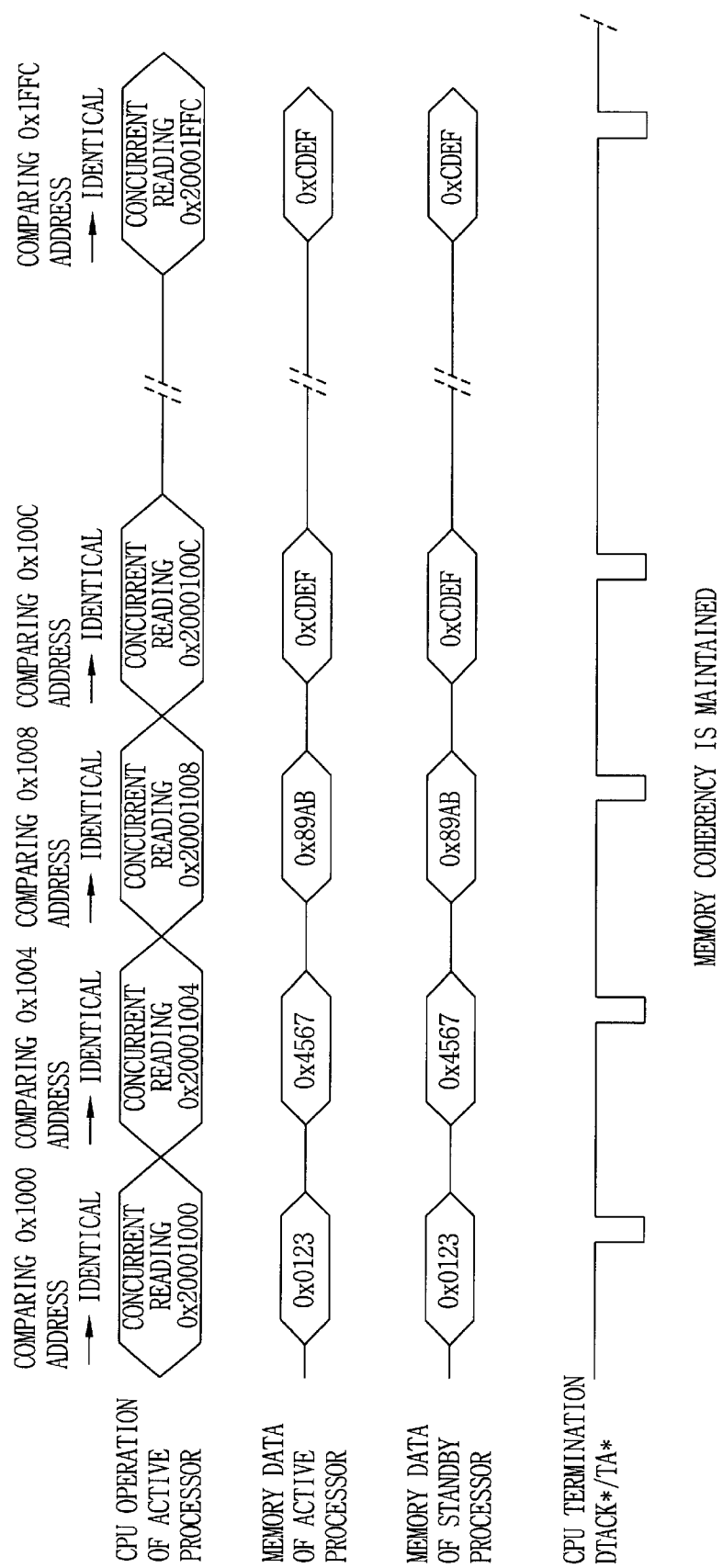

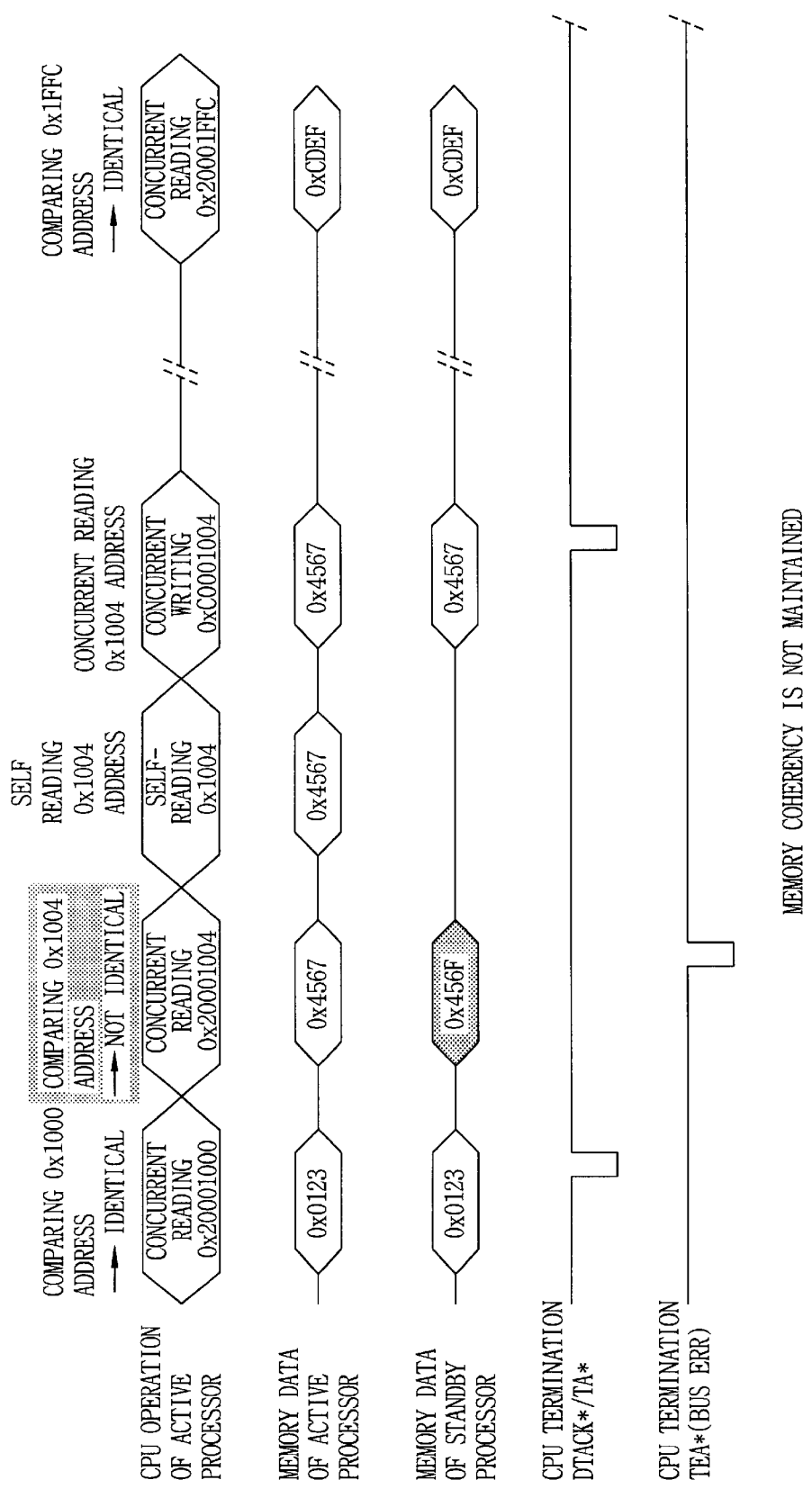

DUPLEXING STRUCTURE OF SWITCHING SYSTEM PROCESSOR AND METHOD FOR MAINTAINING MEMORY COHERENCY

BACKGROUND OF THE INVENTION

1. Field of the Invention

The present invention relates to a switching system, and more particularly, a duplexing processor in a switching system and method thereof.

2. Background of the Related Art

In general, a switching system includes a plurality of processors, which are required to process data on a real time basis, and are managed by a duplexing channel to prevent an interruption in processing of data even when a malfunction occurs. A duplexing channel is generally formed through a back plane between two processor boards having the same construction. While one processor is operating in an active mode, the other processor is operating in a standby mode. When a disturbance occurs at the active mode processor, the standby mode processor is switched to an active mode to successively perform the data processing.

As the processor is switched oil duplexing, the memories of the two processors should be identical to each other in order for the CPU of the standby processor to successively perform its normal operation. For this purpose, when the CPU of the active processor performs a data writing operation on its memory, it performs a concurrent writing operation when the data is one to be concurrently written into the memory of the standby processor. Accordingly, the same data is written into the same address of the memory of the active processor and into the memory of the standby processor. In order to identify whether the concurrent writing was successfully performed, the CPU of the active processor periodically compares the two memories of the two processor, thereby maintaining a coherency of the memories of the active processor and the standby processor.

The operation of the background art duplexing processor will now be described with reference to FIG. 1. The duplexing processor of the switching system consists of an active processor 10 and a standby processor 20 that are connected to each other through a duplexing bus. The active processor 10 and the standby processor 20 respectively include a CPU 11 and 21, a memory 12 and 22, a concurrent write logic unit 13 and 23, and a standby read logic unit 14 and 24.

The CPU 11 of the active processor 10 performs three kinds of operations: (1) a self-reading and writing operation for reading or writing only its own memory (active memory 12); (2) a concurrent writing operation for concurrently writing the same data also on the memory (standby memory 22) of the standby processor when writing the data on the active memory 12; and (3) a standby reading operation for reading a data of a corresponding arbitrary address of the standby memory 22 to compare it with the data written in the arbitrary address of the active memory 12 to check whether the concurrent writing operation was correctly performed.

The three operations are divided by an agreement between a software and a hardware. For example, regarding '68000/68020/68030' type CPUs in the line of 68XXX processors, the three operations are performed according to classification of an address field value, and a logic of the hardware is driven according to the address field value. While the three operations are performed by a UPA0/UPA1 (UPA: User Page Attributes) of the CPU with respect to '68040/68060'.

For example, on the assumption of 128 Mbyte memory, the operation of the CPU are as shown Table 1 as follows:

TABLE 1

| | 68000/68020/68030 address field) | 68040/68060 (UPA bit) |
|---|---|---|
| (1) Self-reading and writing | 0x00000000~0x07FFFFFF | UPA1:UPA0 = '00' |
| (2) Concurrent writing | 0xC0000000~0xC7FFFFFF | UPA1:UPA0 = '01' |
| (3) Standby reading | 0x40000000~0x47FFFFFF | UPA1:UPA0 = '10' |
| (4) Reserved | Undefined | UPA1:UPA0 = '11' |

In this manner, when the operation state of the CPU 11 is represented according to the setting of the address field value or the UPA bit value previously determined on the basis of software, the hardware drives logic that is suitable for the operation.

When an address field value or a UPA bit value corresponding to the '(2) concurrent writing' operation of Table 1 is applied from the CPU 11, the concurrent write logic unit 13 accesses the memory 22 of the standby processor through the duplexing bus and writes the same data into the two memories 12 and 22. When an address field value or a UPA bit value corresponding to the '(3) standby reading' operation of Table 1 is applied from the CPU 11, the standby read logic unit 14 accesses the memory 22 of the standby processor through the duplexing bus and reads the data of the memory 22 to transfer it to the CPU 11. The three operations of the background art duplexing processor will now be described.

1. Self Reading and Writing Operation

This operation is performed when the data written in the active memory 12 is desired to be read by the CPU 11, and when the data is desired to be written only in the active memory 12. That is, the data written into the memory 12 is not written into the standby memory 22 because the data wouldn't affect the operation of the CPU 22.

First, the CPU 11 sets an address field value or a UPA bit value corresponding to the '(1) Self reading and writing' operation of Table 1 and selects an address desired to be read or written. The units 13 and 14 corresponding to the duplexing logic are not driven, and only the corresponding active memory 12 is accessed. Thus, the data of the corresponding address is read or written.

2. Concurrent Writing Operation

This operation is performed when the data is desired to be concurrently written into the active memory 12 and the standby memory 22 by the CPU 11. First, the CPU 11 sets an address field value or a UPA bit value corresponding to the '(2) concurrent writing' operation of Table 1 and outputs a data to be written and its address. Thereafter, the data is written into the corresponding address of the active memory 12, and simultaneously, the concurrent write logic unit 13 is driven.

The concurrent write drive unit 13 accesses the memory 22 of the standby processor and transfers the same data as the data transferred to the active memory 12 through the duplexing bus. Accordingly, the same data as that written in the active memory 12 is written into the corresponding address of the standby memory 22.

3. Memory Coherency Maintaining Operation

This operation is performed to periodically identify whether the same data was written in the active memory 12 and in the standby memory 22 by means of the CPU 11 of the active processor 10. Memory coherency enables the CPU 21 of the standby processor 20 to be able to continuously perform the operation of the previous active processor in case of the duplexing switch.

First, the active memory 12 is accessed and a data written in the corresponding address of the memory 12 is applied to the CPU 11. Thereafter, when the CPU 11 selects the address field value or the UPA bit value corresponding to the '(3) standby read' operation of Table 1 and the same address as above, the standby read logic unit 14 is driven.

The standby read logic unit 14 accesses the memory 22 of the standby processor, reads a data of a corresponding address of the memory 22 and transfers it to the CPU 11 through the duplexing bus. Thereafter, the CPU 11 compares the data as read from the active memory 12 and the data as read from the standby memory 22. If the two data are identical, the CPU 11 repeatedly performs the above process to thereby compare the data of the next address.

Meanwhile, upon such comparison, if the two data of the memories 12 and 22 are not identical, the CPU 11 sets a field value of the discordant address or a UPA bit value corresponding to the '(2) concurrent writting' operation of Table 1. Accordingly, the concurrent write logic unit 13 is driven so as to transfer a data of a predetermined address of the active memory 12 to the standby memory 22 through the duplexing bus. In this manner, the same data as the data written in the active memory 12 is written into the corresponding address where the discordance occurred of the standby memory 22.

FIGS. 2A and 2B show views of timing of an example of the memory coherency maintaining operation of the duplexing processor. FIG. 2A shows the case where the two memories are identical, and FIG. 2B shows the case where the two memories are not identical.

Referring to FIGS. 2A and 2B, in the case where the CPU 11 compares the data of a specific address, i.e., '0x1000', it sets the address as '0x1000' to represent a self-reading operation and accesses the active memory 12 to read a corresponding address value. Thereafter, the CPU 11 sets the address as '0x40001000' so as to represent a standby reading operation, and drives the standby read logic unit 14 to receive the corresponding address value of the standby memory 22.

The CPU 11 compares the data read from the two memory 12 and 22. As shown in FIG. 2A, if the two data as read are equal(i.e., '0x0123'), it sets the next address to be compared (i.e., '0x1004'). The CPU 11 then repeatedly performs the same process described above.

Meanwhile, as shown in FIG. 2B, if the two data as read are not equal (i.e., '0x0123' and '0x012F'), the CPU 11 again reads the data '0x0123' of the corresponding address '0x1000' of the active memory 12 and then drives the concurrent write logic unit 13 to concurrently writes the data '0x0123' into the active memory 12 and the standby memory 22.

Thereafter, the CPU 11 performs comparing operation for the next address (i.e., '0x1004') using the same process as described above. Thus, the process for maintaining the memory coherency in the background art duplexing processor is performed by reading the data of the active memory, reading the data of the standby memory, comparing the two data, and performing the concurrently writing operation according to the comparison result.

As described above, the background art duplexing processor has various disadvantages. The CPU of the active processor performs each step by contiguously changing the address values needed to perform each operation and compares the data on the basis of software, which results in a lengthy time for the operation and a load of the CPU is increased. Thus, because of the verification time limit and the restraint of the load of the CPU, it is hard to perform such a verification function while the processor is actually in service (i.e., processing of a call of actual subscribers, or billing). Accordingly, the reliability of the processor is reduced.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a switching system processor and method that substantially obviates one or more of the problems caused by disadvantages in the background art.

Another object of the present invention is to provide a duplexing processor operated in a standby and active mode that maintains coherent memory and method thereof.

Another object of the present invention is to provide a duplexing structure of a switching system processor and method in which both data of an active memory and of a standby memory are concurrently read and the data as read are compared on the basis of hardware for maintaining a memory coherency.

To achieve these objects and other advantages in a whole or in part and in accordance with the purpose of the present invention, as embodied and broadly described herein, there is provided a switching system having a duplexing channel between two processors each adapted to operate in an active mode and a standby mode, each processor that includes a memory, a CPU that generates a control signal for concurrently reading a selected memory address to be compared, a concurrent read logic unit that concurrently accesses memories of an active processor and a standby processor responsive to the control signal of the CPU and reads data from the selected addresses in the memories, a comparator that compares the two data from the selected address of the memories of the two processors, and a concurrent read termination generator that generates a prescribed termination signal according to a comparison result by the comparator.

To further achieve these objects and other advantages in a whole or in part and in accordance with the purpose of the present invention, as embodied and broadly described herein, there is provided a method for maintaining a memory coherency of a switching system processor having a duplexing channel between two processors that each mutually operate in an active mode and a standby mode, respectively, that includes generating a prescribed control signal to perform a concurrent reading operation for an arbitrary memory address, concurrently accessing memories of the active and standby processors, respectively, to read data from the arbitrary address of both memories responsive to the control signal, comparing the data read from the two processor memories, and generating a termination signal according to a comparison result.

To further achieve these objects and other advantages in a whole or in part and in accordance with the purpose of the present invention, as embodied and broadly described herein, there is provided a switching system having a data bus between a plurality of processors each adapted to operate in an active mode and a standby mode, wherein at least one processor is in the active mode mid remaining processors are in the standby mode, each processor that includes a memory, a CPU that generates a control signal for concurrently reading a selected memory address to be compared, a concurrent read logic unit that concurrently accesses memories of the at least one active processor and the standby processors responsive to the control signal of the CPU and reads data from the selected addresses in the memories, a comparator that compares the data from the selected address of the memories of the processors, and a concurrent read termination generator that generates a prescribed termination signal according to a comparison result by the comparator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 4A and 4B are timing diagrams showing a preferred embodiment of a process of maintaining a memory coherency of a duplexing processor in accordance with the present invention

DETAILED DESCRIPTION OF PREFERRED EMBODIMENTS

Figure 1:
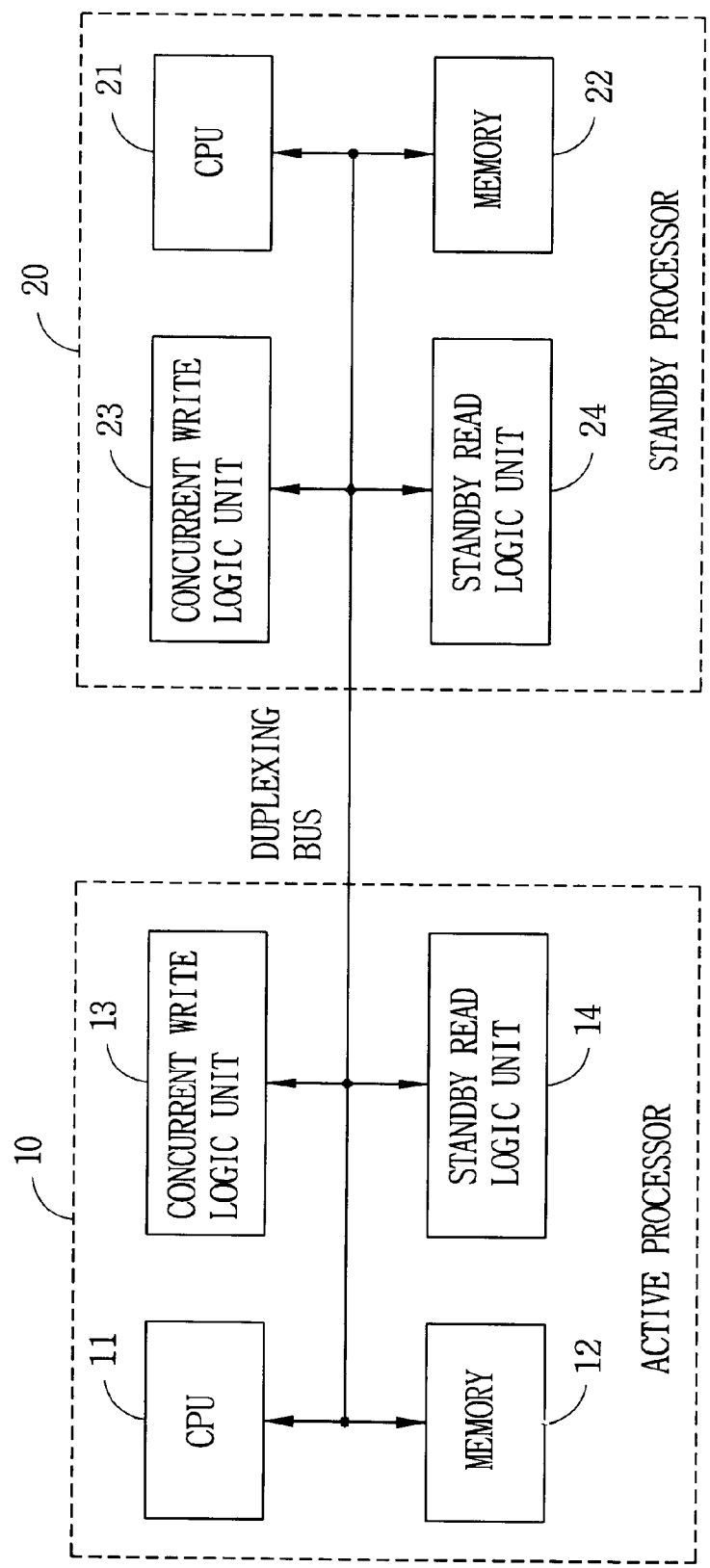
FIG. 1 is a schematic block diagram of a background art switching system processor as implemented by duplexing.
Figure 2A:
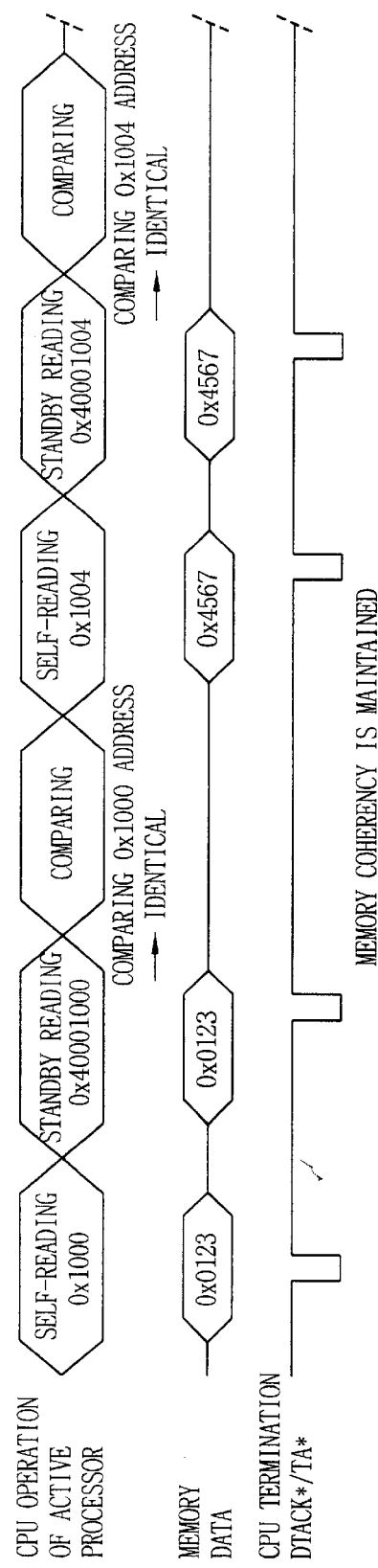
FIGS. 2A and 2B are timing diagrams showing an example of a process of maintaining a memory coherency of the background art duplexing processor of FIG. 1.
Figure 2B:
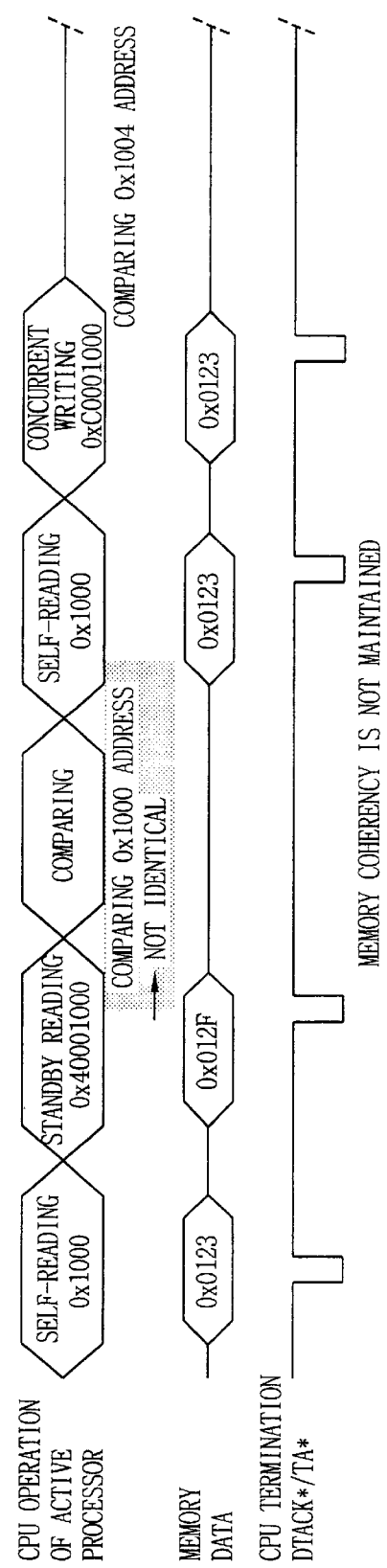
Figure 3:
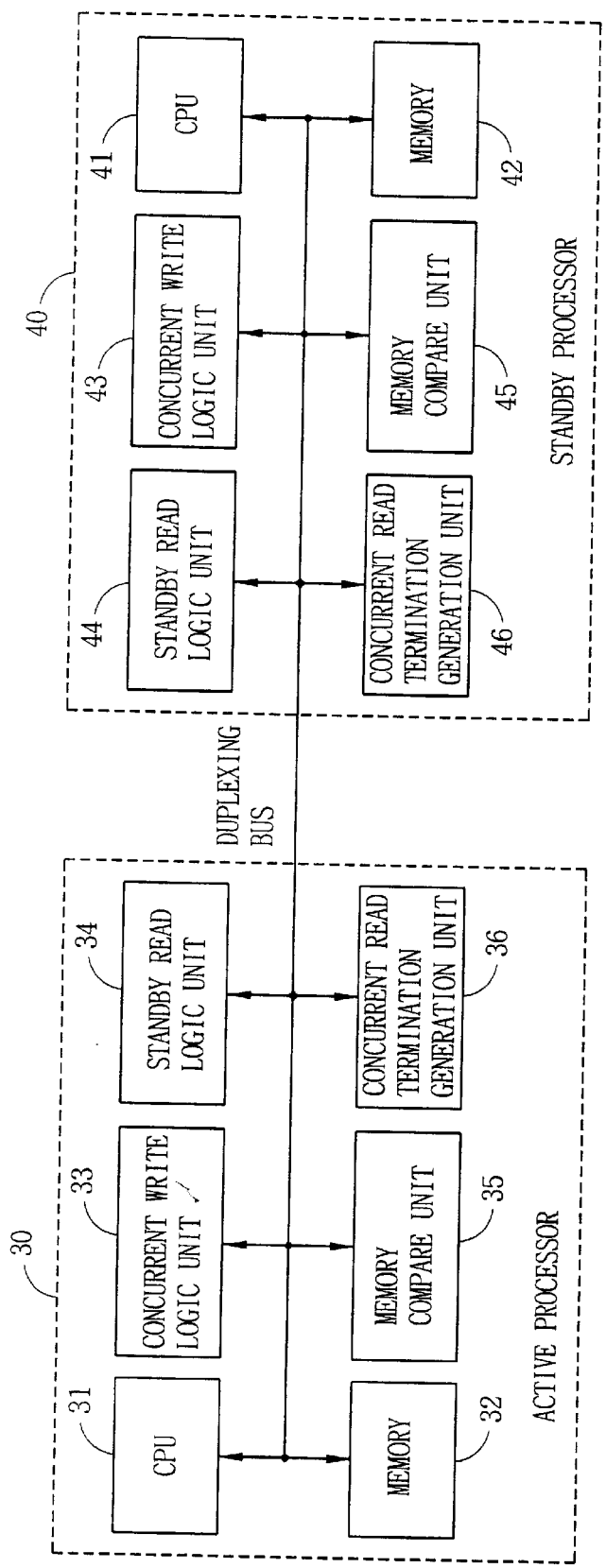
FIG. 3 is a diagram showing a preferred embodiment of a switching system processor in accordance with the present invenition.

FIG. 3 is a schematic block diagram showing internal construction of a first preferred embodiment of a switching system processor in accordance with the present invention. The first preferred embodiment of a switching system processor is implemented on a duplexer processor, however, the present invention is not intended to be so limited. As shown in FIG. 3, an active processor 30 and a standby processor 40 of a duplexing processor in accordance with the first preferred embodiment respectively include CPUs 31 and 41, memories 32 and 42, concurrent write logic units 33 and 43, standby read logic units 34 and 44, memory compare units 35 and 45, and concurrent read termination generation units 36 and 46.

An address field value or a UPA bit value for performing a concurrent reading is pre-defined for the.CPUs 31 and 41 by preferably using values that were previously not defined. As described above, the address field value or the UPA bit value for performing a self reading and writing operation, a concurrent writing operation and a standby reading operation are already defined in the background art as shown in Table 1.

For example, an address field value of '0x20000000' may be used for "concurrent reading" in the case of 68000/68020/68030 type CPUs in the line of 68XXX processors, and a UPA bit value of '11' may be used for the case of '68040/68060'. As shown in Table 1, the address field values 0x20000000~0x27FFFFFF are not yet defined When a selected one of the CPUs 31 and 41 sets an address value corresponding to the concurrent reading, the memory compare units 35 and 45 simultaneously receives the data for the address from its own memory and the memories 32 and 42 at the other side (i.e., processor) and compares the two data to judge whether they are identical to each other on the basis of hardware. In this respect, the reading of the memory at the other side is preferably performed by the standby read logic units 34 and 44 without the necessity of any additional logic. Further, in this case, the CPU 31 or 41 is selected by being in the active mode.

The concurrent read termination generation units 36 and 46 preferably checks whether a normal (successful) operation was performed according to the comparison result by means of the memory compare units 35 and 45, and transfers it to the CPUs 32 and 42.

Operations of the memories 32 and 42, the concurrent write logic units 33 and 43, and the standby read logic units 34 and 44 are the same as those in the background art. Accordingly, a detailed description is omitted.

A second preferred embodiment in accordance with the present invention of a process for maintaining memory coherency of a switching system processor will now be described. The second preferred embodiment of the process for maintaining memory coherency can be used, for example, in the first preferred embodiment of a duplexing processor. However, the present invention is not intended to be so limited. The second preferred embodiment of the process for maintaining memory coherency implemented by duplexing will be described wvith respect to the duplexing processor of FIG. 3.

First, the CPU 31 sets an address field value or a UPA bit value corresponding to the concurrent reading as pre-defined and a memory address desirous of coherency validation. Thereafter, the data written in the corresponding address of the active memory 32 is applied to a terminal of the memory compare unit 35, and simultaneously, the standby read logic unit 34 is driven.

The standby read logic unit 34 accesses the memory 42 of the standby processor, reads the data of the corresponding address of the memory 42 and transfers it to the memory compare unit 35 through the duplexing bus. The memory compare unit 35 compares the data as read from the active memory 32 and the data as read from the standby memory 42, and if the two data are identical to each other, the memory compare unit 35 generates a predetermined match signal.

Accordingly, the concurrent read termination generation unit 36 applies a termination signal to the CPU 31 indicating the operation was normally performed to the CPU 31. Then, the CPU 31 repeatedly performs the process as described above to compare the next address.

However, if upon comparison the data from the two memories 32 and 42 compared by memory compare unit 35 are not identical to each other, the memory compare unit 35 generates a predetermined mismatch signal. Accordingly, the concurrent read termination generation unit 36 applies a signal to the CPU 31 indicating an abnormal operation was performed to the CPU 31. In this case, the CPU 31 sets an address field value corresponding to the self reading and writing operation, reads a data written in the active memory 32, and again resets an address field value corresponding to the concurrent writing operation. Then, the CPU 31 performs the concurrent writing operation into the active memory 32 and the standby memory 42.

In this manner, the coherency for the corresponding addresses of the two memories 32 and 42 can be maintained without a separate access in time of the processors in the switching system. The CPU 31 preferably repeatedly performs the same processes as described above for the next address to be compared.

FIGS. 4A and 4B are views of timing showing a process of maintaining a memory coherency of the duplexing processor in accordance with the second preferred embodiment of the present invention. FIG. 4A shows the case that the data of the addresses desired to be compared of the two memories 32 and 42 are identical, and FIG. 4B shows the case that the data of the addresses desired to be compared of the two memories 32 and 42 are not identical. As shown in FIGS. 4A and 4B, an address field value representing the concurrent reading is defined as '0x2000000-0x27FFFFFF'.

As shown in FIG. 4A to compare data of each address of '0x1000', the CPU 31 preferably generates an address of '0x2000100' representing the concurrent reading operation for the '0x1000' address. The data of the active memory 32 corresponding to the '0x1000' address is transferred to the memory compare unit 35. Simultaneously, the standby read logic unit 34 is driven so that the data of '0x1000' address of the memory 42 of the standby processor 40 is transferred to the memory compare unit 35 through the duplexing bus.

The memory compare unit 35 compares the data as read from the memory 32 and from the memory 42. As shown in FIG. 4A, when the two data as read are the same (e.g., '0x0123'), the memory compare unit 35 does not generate an error or a MISMATCH* signal. Thus, the concurrent read termination generation unit 36 transfers a termination signal, that is for example, a DTACK* signal or TA* signal, informing the CPU 31 that the normal bus operation was completed.

Accordingly, the CPU 31 identifies that the '0x1000' addresses of the two memories 32 and 42 are identical to each other, sets an address value as '0x20001004' for comparing the next address (e.g., a '0x1004' address) to be compared and repeatedly performs the above described processes.

As shown in FIG. 4B, when the two data respectively transferred from the '0x1004' addresses of the two memories 32 and 42 are not identical in the concurrent reading operation (e.g., '0x4567' and '0x456F'), the memory compare unit 35 generates the error or the MISMATCH* signal. The concurrent read termination generation unit 36 preferably transfers, for example a BERR* or a TEA* signal to the CPU 31, informing that an abnormal bus operation was performed.

Accordingly, the CPU 31 identifies that the '0x1004' address of the two memories 32 and 42 are not identical to each other and performs an operation to make them identical. For this purpose, the CPU 31 preferably sets an address as '0x00001004' corresponding to the self-reading operation for '0x1004' and reads the data of the '0x1004' address of the active memory 32. Thereafter, the CPU 31 sets the address as '0x00001004' to perform the concurrent writing for the address. Then, the concurrent write logic unit 33 is driven and the same data as that of the active memory 32 are simultaneously written in the standby memory 42 to maintain coherency for the address. Again, the CPU 31 can repeatedly perform the above described processes for the next address to be compared.

As described above, preferred embodiments of a switching system processor (e.g., duplex) and method of memory coherency thereof according to the present invention have various advantages. According to the preferred embodiment of a duplexing structure of a switching system processor and a method for maintaining memory coherency, an address corresponding to the concurrent reading operation is set and a path is provided therefore. Accordingly, when the active memory and the standby memory are compared, the memories are simultaneously accessed and compared for judgement at one time, unlike that of the background art where the two memories are separately accessed. Thus, a time required for the operation is much reduced. Further, the result can be recognized according to the kinds of the termination that is applied by hardware without comparing the two data relying on a series of program operations on the basis of software using the CPU so that the load of the CPU required with respect to memory coherency verification can be reduced. Accordingly, the concurrent reading operation of the preferred embodiments can be efficiently performed during actual service by the CPU.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but-also equivalent structures.

What is claimed is:

1. A switching system having a duplexing channel between two processors each adapted to operate in an active mode and a standby mode, each processor comprising:
   a memory;
   a CPU that generates a control signal for concurrently reading a selected memory address to be compared;
   a concurrent read logic unit that concurrently accesses memories of an active processor and a standby processor responsive to the control signal of the CPU and reads data from the selected addresses in the memory of the active processor and the memory of the standby processor;
   a comparator that compares the two data from the selected address of the memories of the active and standby processors; and
   a concurrent read termination generator that generates a prescribed termination signal according to a comparison result by the comparator.

2. The system of claim 1, wherein a field value of the address for performing the concurrent reading operation is defined in the CPU.

3. The system of claim 2, wherein additional field values of the address are respectively 00000000~07FFFFFF for a self read/write operation, C0000000~C7FFFFFF for a concurrent write operation and 40000000~47FFFFFF for a standby read operation.

4. The system of claim 1, wherein the concurrent read termination generator of the active processor applies one of a normal termination signal to the CPU of the active processor when the comparison result indicates the two data are equal and a bus error termination signal otherwise.

5. The system of claim 1, wherein the CPU of the active processor controls the concurrent reading process for a next address to be compared responsive to a normal termination signal from the concurrent read termination generator for the selected address.

6. The system of claim 1, wherein the CPU reads the data from the selected address of the memory of the active processor and then concurrently rewrites the data from the selected address of the memory of the active processor in the selected address of the memories of the active and standby processors responsive to an abnormal termination signal from the concurrent read termination generator.

7. The system of claim 1, further comprising a concurrent write logic unit that concurrently writes data in the memories of the active and the standby processors under control of the CPU.

8. The system of claim 1, wherein each processor comprises a processor board.

9. A method for maintaining a memory coherency of a switching system processor having a duplexing channel between two processors that each mutually operate in an active mode and a standby mode, respectively, comprising:

generating a prescribed control signal to perform a concurrent reading operation for an arbitrary memory address;

concurrently accessing memories of the active and standby processors, respectively, to read data from the arbitrary address of both memories responsive to the control signal;

comparing the data read from the two processor memories; and generating a termination signal according to a comparison result.

10. The method according to claim 9, wherein an address field value for performing the concurrent reading operation is defined in a CPU of the processors to generate the prescribed control signal.

11. The method of claim 10, wherein address field values are defined for a self read/write operation, a concurrent write operation and a standby read operation in the CPU.

12. The method according to claim 9, wherein the generating the termination signal comprises:

generating a normal terminal signal when the two data are equal according to the comparison result and an abnormal termination signal when the two data are not equal; and applying the termination signal to the active CPU.

13. The method according to claim 12, further comprising performing the concurrent read process for a next address relative to the arbitrary address.

14. The method of according to claim 13, wherein when the normal termination signal is applied, the generating a prescribed signal step through generating a termination signal step comprise the performing the concurrent read process for the next address.

15. The system according to claim 13, wherein when the abnormal termination signal is applied, the data is read from the arbitrary address of the memory of the active processor and then concurrently rewritten in the arbitrary addresses of the memories of the active and the standby processors before the performing the concurrent read operation for the next address.

16. A switching system having a data bus between a plurality of processors each adapted to operate in an active mode and a standby mode, wherein at least one processor is in the active mode and remaining processors are in the standby mode, each processor comprising:

a memory;

a CPU that generates a control signal for concurrently reading a selected memory address to be compared;

a concurrent read logic unit that concurrently accesses memories of the at least one active mode processor and the standby mode processors responsive to the control signal of the CPU of the at least one active mode processor and reads data from the selected addresses in the memories;

a comparator that compares the data from the selected address of the memories of the processors; and a concurrent read termination generator that generates a prescribed termination signal according to a comparison result by the comparator.

17. The switching system of claim 16, wherein a field value of the address for performing the concurrent reading operation is defined in the CPU.

18. The switching system of claim 16, wherein the concurrent read termination generator of the active mode processor applies one of a normal termination signal to the CPU of the active mode processor when the comparison result indicates the two data are equal and a bus error termination signal otherwise, and wherein the CPU of the active mode processor controls the concurrent reading process for a next address to be compared responsive to a normal termination signal from the concurrent read termination generator for the selected address.

19. The switching system of claim 16, wherein the CPU reads the data from the selected address of the memory of the active mode processor and then concurrently rewrites the data from the selected address of the memory of the active mode processor in the selected address of the memories of the active and standby mode processors responsive to an abnormal termination signal from the concurrent read termination generator.

20. The switching system of claim 16, further comprising a concurrent write logic unit that concurrently writes data in the memories of the active and the standby mode processors under control of the CPU.

* * * * *